(12) United States Patent
Duschl-Graw

(10) Patent No.: US 9,685,812 B2
(45) Date of Patent: Jun. 20, 2017

(54) DEVICE FOR INDUCTIVE ENERGY TRANSFER

(75) Inventor: Georg Duschl-Graw, Berlin (DE)

(73) Assignee: INGENIEURBURO DUSCHL, Tauche-Giesensdorf (DE)

( * ) Notice: Subject to any disclaimer, the term of this patent is extended or adjusted under 35 U.S.C. 154(b) by 243 days.

(21) Appl. No.: 14/005,566

(22) PCT Filed: Mar. 16, 2012

(86) PCT No.: PCT/DE2012/100068
§ 371 (c)(1),
(2), (4) Date: Sep. 17, 2013

(87) PCT Pub. No.: WO2012/126465
PCT Pub. Date: Sep. 27, 2012

(65) Prior Publication Data
US 2014/0285138 A1    Sep. 25, 2014

(30) Foreign Application Priority Data

Mar. 18, 2011 (DE) .................... 10 2011 014 521

(51) Int. Cl.
*H01F 21/04*     (2006.01)
*H02J 7/02*      (2016.01)
(Continued)

(52) U.S. Cl.
CPC .............. *H02J 7/025* (2013.01); *B60L 5/005* (2013.01); *B60L 11/182* (2013.01); *B60M 7/00* (2013.01);
(Continued)

(58) Field of Classification Search
CPC ............ H01F 21/02; H01F 21/04; H01F 21/06
(Continued)

(56) References Cited

U.S. PATENT DOCUMENTS 3,921,114 A * 11/1975 Bridewell ............... H01F 30/10
336/117
4,612,527 A   9/1986 Third et al.
(Continued)

FOREIGN PATENT DOCUMENTS

CN          1180335       4/1998
CN         101326706     12/2008
(Continued)

*Primary Examiner* — Tuyen Nguyen
(74) *Attorney, Agent, or Firm* — JMB Davis Ben-David

(57) ABSTRACT

A device for inductive energy transfer between a stationary three-phase primary system and a mobile three-phase secondary system shows a stationary iron core part and two mobile iron core parts (3, 5) which are connected electrically in series are each designed as an equilateral triangle or as a star which spans an equilateral triangle and has limbs (3a, 3b, 3c; 5a, 5b, 5c) of equal length which run at the same angle in relation to one another, and supporting posts (3a', 3b', 3c'; 5a', 5b', 5c') which start from the ends of said limbs, and also primary and secondary windings (4, 6) which are arranged at the same distance from one another. The device of simple design has a high degree of efficiency in respect of energy transfer. In the case of energy transfer only in the inoperative state, a stationary iron core part and a mobile iron core part can also be positioned directly one on the other without magnetic rails.

12 Claims, 2 Drawing Sheets

(51) Int. Cl.
  *H01F 21/06* (2006.01)
  *B60L 5/00* (2006.01)
  *B60M 7/00* (2006.01)
  *H01F 38/14* (2006.01)
  *B60L 11/18* (2006.01)

(52) U.S. Cl.
  CPC ............ *H01F 21/04* (2013.01); *H01F 21/06* (2013.01); *H01F 38/14* (2013.01)

(58) Field of Classification Search
  USPC ................................ 336/115–119, 130–136
  See application file for complete search history.

(56) References Cited

U.S. PATENT DOCUMENTS

| | | | |
|---|---|---|---|
| 5,293,308 A | | 3/1994 | Boys et al. |
| 6,008,547 A | * | 12/1999 | Dobler ................. B60R 16/027 336/119 |

FOREIGN PATENT DOCUMENTS

| | | |
|---|---|---|
| CN | 101364747 | 2/2009 |
| DE | 2434890 | 11/1975 |
| DE | 3304719 | 8/1983 |
| DE | 4236340 | 10/1992 |
| DE | 102009021797 | 11/2010 |
| JP | 2004055773 | 2/2004 |
| JP | 2010022183 | 1/2010 |
| WO | 2010137802 | 12/2010 |

\* cited by examiner

DEVICE FOR INDUCTIVE ENERGY TRANSFER

CROSS-REFERENCE TO RELATED APPLICATIONS

This is the U.S. National Stage of International Application No. PCT/DE2012/100068, filed Mar. 16, 2012, which was published in German under PCT Article 21(2), which in turn claims the benefit of Germany Patent Application No. 10 2011 014 521.4, filed Mar. 18, 2011.

The invention relates to a device for inductive energy transfer, in which a track comprises a three-phrase primary system, and an object which rolls or is stationary on the track comprises a three-phase secondary system which can be inductively coupled to the primary system.

Devices for transmitting electrical energy in accordance with the transformer principle have the task of transmitting energy with the aid of AC voltages. This is done with the aid of a magnetic circuit around which conductors of two different electrical circuits are wound. If an AC voltage is applied to a transformer primary coil, an AC voltage is likewise produced at the secondary coil. The ratio of the voltages is proportional to the ratio of the number of turns of the primary coil and of the secondary coil.

DE 4 236 340 C2 discloses an inductive energy transfer arrangement in which the energy is transferred across an air gap without contact. In this case, it is necessary to keep the size of the air gap constant and to keep the track free of impurities.

Inductive energy transfer with contact is proposed in accordance with WO 2010/057799 A1. The electrical energy is transferred by means of a wheel which rolls on a track or road which is connected to a current source. In order to avoid an air gap, the wheel is surrounded by a magnetically permeable elastomer.

DE 33 04 719 A1 discloses a three-phase force transfer system which is based on the transformer principle, in which system first windings are wound around a first magnet core part piece and second windings are wound around a second magnet core part piece, and the first and the second magnet core part pieces can be moved relative to one another. With this—magnetically asymmetrical—type of transformer for mobile energy transfer, a complicated arrangement and supply of current to auxiliary windings is required on account of the different positions of the mobile secondary system in order to prevent parts of the iron core being saturated, and as a result the efficiency being adversely affected, under loading. In addition, the application of asymmetrical transformers during mobile energy transfer is associated with a considerable development of noise.

The invention is based on the object of specifying a device for the three-phase transfer of electrical energy between a track and an object which moves or is stationary on said track and which is of simple design and exhibits a high degree of efficiency.

According to the invention, the object is achieved by a device which is designed in accordance with the features of patent claim 1 or of patent claim 6.

Advantageous developments of the invention are the subject matter of the dependent claims.

In a device for inductive energy transfer between a three-phase stationary primary system and a mobile three-phase secondary system, the basic idea of the invention is in the magnetically symmetrical design with magnetic flux paths, which are of equal length irrespective of the respective position of the mobile secondary system, in the three phases and correspondingly approximately constant power transfer. According to the invention, the ferromagnetic stationary and mobile iron core parts are in the form of an equilateral triangle or in the form of a star which spans an equilateral triangle and has limbs of equal length which run at the same angle in relation to one another and supporting posts which extend from the ends of said limbs and also primary or secondary windings which are arranged at the same distance from one another. That is to say, the primary and secondary windings are located at the imaginary corner points of an equilateral triangle. In order to transfer energy during the movement of the object which can roll, two stationary iron core parts which are arranged at a distance one behind the other are connected on the primary side at the respective supporting posts by means of parallel ferromagnetic track rails (magnetic rails) which are situated in the same plane and on which the mobile iron core part can roll or can be positioned at different points with the aid of ferromagnetic running rollers which are accommodated in recesses in the mobile supporting posts.

On account of the symmetrical design of the transformer which is proposed here for three-phase mobile energy transfer, the paths in the laminated iron core are the same for all three phases, with the result that symmetrical magnetic fluxes and therefore—specifically also in interaction with the air gap minimization which is produced by the ferromagnetic running rollers—a high degree of efficiency of energy transfer are achieved and stray fluxes are minimized in each position of the mobile secondary system. That is to say, a symmetrical magnetic flux distribution into the yokes of the secondary system and relatively constant and additionally low-noise power transfer are ensured irrespective of the position of the secondary system on the magnetic rails on account of the magnetically symmetrical design in the event of symmetrical loading.

In a refinement of the invention, two stationary iron core parts which are arranged at a distance, are provided with primary windings and are connected in series, form a track segment, which can adjoin a voltage source, in connection with the magnetic rails. Two or more track segments can be arranged one behind the other such that they are magnetically isolated from one another.

In a refinement of the invention, the primary windings and the secondary windings are arranged on the supporting posts or on the limbs of the star-shaped iron core parts at the same distance from the center points of said iron core parts or centrally on the limbs of the triangular iron core parts.

In a further refinement of the invention, the magnetic rails are incorporated in a track, and the stationary iron core parts and primary windings are arranged underground.

In an advantageous development of the invention, the magnetic rails or the running rollers are coated with a ferromagnetic, strong yet elastic, material in order to further reduce the air gap between the primary system and the secondary system. In addition, the rolling properties are improved as a result.

According to a yet further feature of the invention, the interconnection of the magnetic rails and running rollers can be dispensed with for inductive energy transfer in a solely stationary state of the object which can roll. In this case, the mobile iron core part which is arranged in a moving object but is formed without running rollers is lowered, by way of its supporting posts, directly onto the supporting posts of a stationary iron core part which is integrated in a track or parking area.

The stationary and mobile iron core parts are again in the form of an equilateral triangle or in the form of a star which spans an equilateral triangle and has limbs of equal length which run at the same angle in relation to one another and supporting posts which extend from the ends of said limbs and also primary or secondary windings which are arranged at the same distance from one another.

The object which can roll is a vehicle which is entirely or partly electrically driven by means of rechargeable batteries and in which the horizontally and vertically adjustable mobile iron core part is arranged such that it can be lowered onto the magnetic rails or directly onto the stationary iron core part in order to recharge the rechargeable batteries in a moving or stationary state of the vehicle, wherein the primary windings of the track segment are supplied with current only when they are in contact with the mobile iron core part.

In a further embodiment of the invention, means for feeding a signal to the secondary system and means for identifying this signal in the primary system are provided, wherein the signal in the primary system can be identified only when there is a closed magnetic circuit between the primary system and secondary system.

It goes without saying that, with corresponding structural adjustment, it is also feasible to use a polyphase device which is formed with more than three phases in accordance with the present principle of the invention, instead of the three-phase energy transfer device.

An exemplary embodiment of the invention will be explained in greater detail with reference to the drawing, in which.

Figure 1:
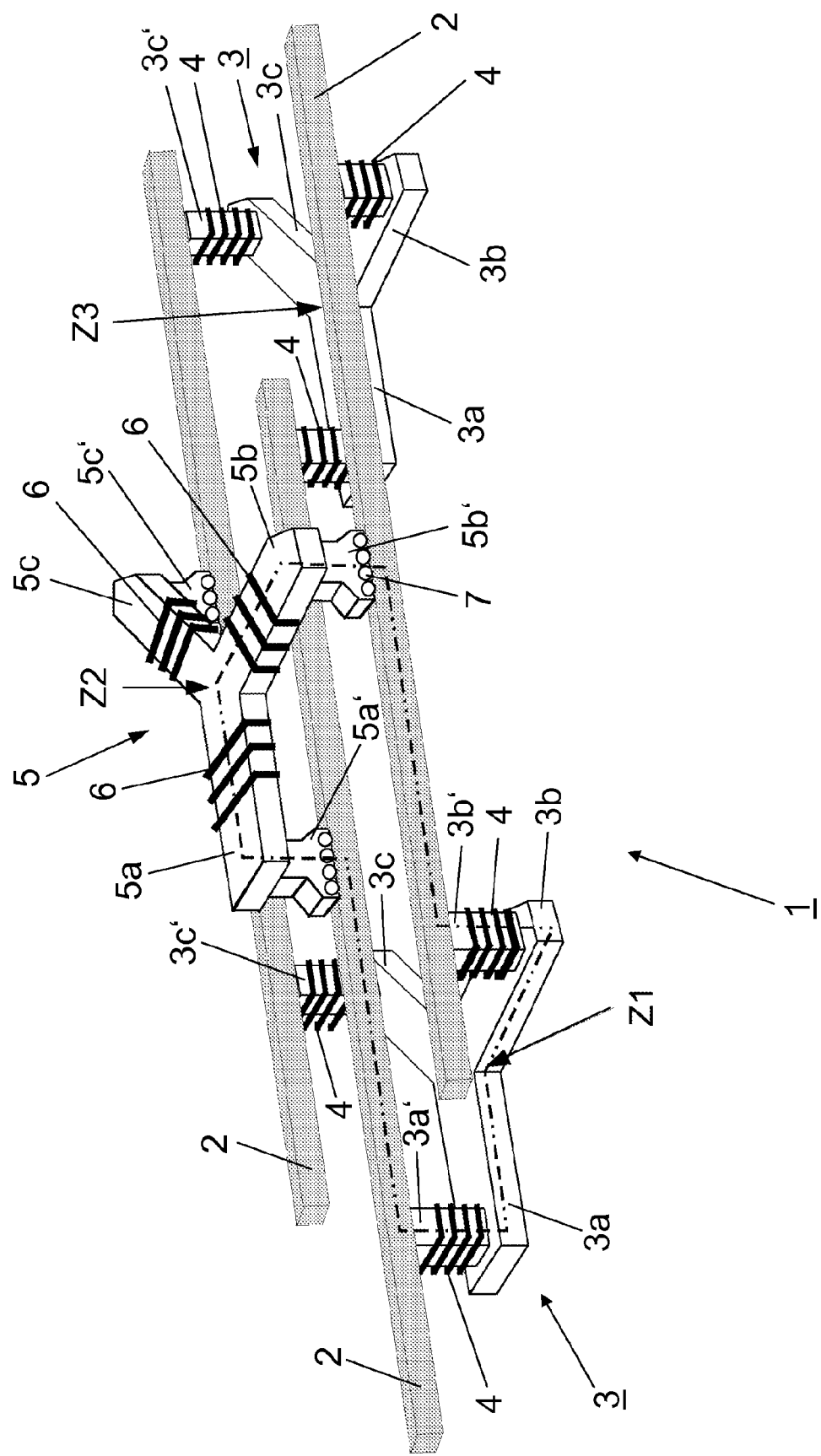
FIG. 1 shows a schematic illustration of a device for three-phase inductive energy transfer between a track segment which is in the form of a primary system and a secondary system which is held on a vehicle and can roll on said track segment.

The track segment 1 which represents a primary system of a three-phase transformer comprises three magnetic rails 2 which are arranged parallel and in one plane, and a first and second ferromagnetic—first and second—stationary iron core part 3 which is connected to said track segment and is integrally formed from three limbs 3*a*, 3*b* and 3*c*. The limbs 3*a*, 3*b*, 3*c* each have the same length and extend in a star-shaped manner and symmetrically from a common center point Z1, Z3, wherein in each case two—adjacent—limbs which are arranged at an angle in relation to one another each form an identical isosceles triangle. The end points of the limbs 3*a*, 3*b*, 3*c* correspond to the corner points of an equilateral triangle. A supporting post 3*a*', 3*b*', 3*c*' which extends away from the end of each limb is in each case connected to the lower face of one of the three magnetic rails 2 and in each case carries a primary winding 4 which is connected to a voltage source (not illustrated). The primary windings 4 are therefore arranged on a star-shaped stationary iron core part 3, that is to say geometrically at the corner points of an equilateral triangle. Whereas the magnetic rails 2 are incorporated into a track surface in a substantially flush manner, the two ferromagnetic iron core parts 3, which are positioned at a distance in relation to one another, of the track segment 1 are arranged underground. The two stationary iron core parts 3 which are connected to the magnetic rails 2 at a distance from one another are connected electrically in parallel. As a result, the magnetic flux in the secondary limbs is largely independent of the position of the secondary system on the magnetic rails. A plurality of track segments 1 which are magnetically isolated from one another can be integrated one behind the other in a track in order to thus create an elongate stationary primary system for energy transfer to an object which can move on a track and is equipped with a mobile secondary system of the three-phase rolling transformer.

Figure 3:
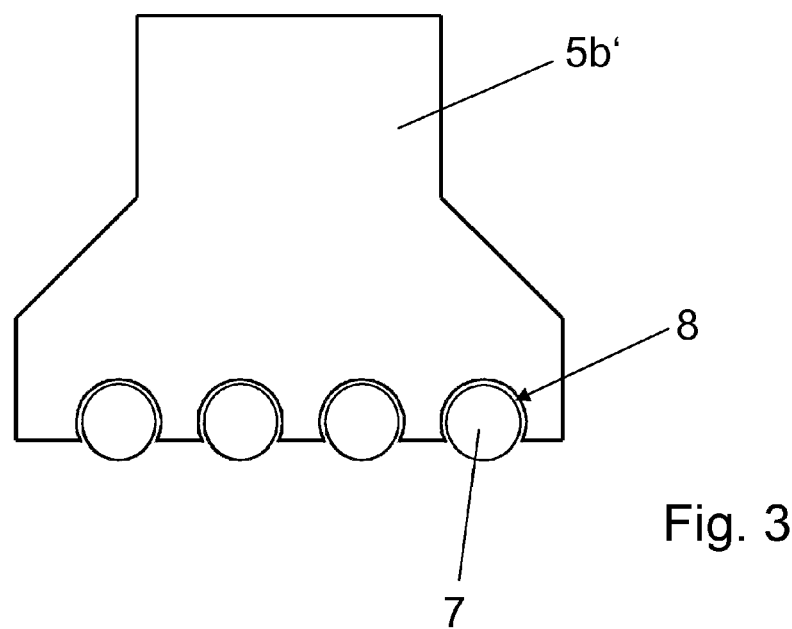
FIG. 3 shows an enlarged schematic side view of a supporting post of the secondary system with integrated running rollers.

The mobile secondary system which is provided for energy transfer during the movement of an object which can roll comprises, as shown in FIG. 1, a mobile ferromagnetic iron core part 5 with three limbs 5*a*, 5*b*, 5*c* which are oriented in a star-shaped manner in relation to one another, are of equal length and each extend from a center point Z2 at the same angle in relation to one another, and supporting posts 5*a*', 5*b*' and 5*c*' which extend from the ends of said limbs in the direction of the track rails 2. The end points of the limbs 5*a*, 5*b*, 5*c* correspond to the corner points of an equilateral triangle. A secondary winding 6 which is connected to a load in the object (not illustrated) which can roll is in each case fitted to the limbs 5*a*, 5*b*, 5*c* at the same distance from the center point Z3 of the mobile iron core part 5. The mobility of the secondary system on the magnetic rails 2 is ensured by cylindrical running rollers 7 which are formed in the supporting posts 5*a*', 5*b*', 5*c*' and which—like the mobile limbs and supporting posts—are composed of ferromagnetic material and are incorporated in cylindrical recesses 8, which leave a narrow gap, on the free side of the posts which is directed toward the magnetic rails 2. The ferromagnetic running rollers 7, of which, as shown in FIG. 3, only a narrow cylindrical section projects from the main surface of the supporting posts 5*a*', 5*b*', 5*c*', are therefore intrinsic constituent parts of the iron core part 5, with the result that there is only a very narrow air gap between the mobile iron core part 5 and the magnetic rails 2 of the stationary iron core part 3, and the energy transfer losses which are caused by the air gap are therefore low. In order to reduce the air gap losses, it is also feasible to coat the track rails with an elastic, magnetically permeable coating (not illustrated), for example a ferromagnetic elastomer.

As illustrated by way of example with reference to the dash-dotted line in FIG. 1, all the possible magnetic flux paths—here, for example, from Z1 to Z2 (or from Z3 to Z2)—are of equal length in the above-described design of a three-phase transformer. This means that the magnetic resistors in the three magnetic component circuits from Z1 to Z2 and from Z3 to Z2 are each the same, with the result that magnetic fluxes of approximately equal magnitude are produced in the secondary circuit under symmetrical electrical loading.

In the magnetically symmetrical design for three-phase inductive energy transfer proposed here, there is a magnetic flux of equal magnitude in each position of the mobile iron core part 5 in relation to the stationary iron core part 3, with the result that no asymmetrical saturation, which reduces the degree of efficiency, can enter parts of the transformer, and therefore a high degree of efficiency of electrical energy transfer between the stationary primary system and the mobile secondary system is ensured, under symmetrical loading. Furthermore, the complex arrangement of auxiliary windings which are correspondingly supplied with current which is required in the transformer design, which is known from the prior art, with asymmetrical magnetic properties is dispensed with. In addition, the magnetically symmetrical three-phase transformer design proposed here is distinguished by a formation of noise which is considerably reduced in relation to the known asymmetrical design.

Figure 2:
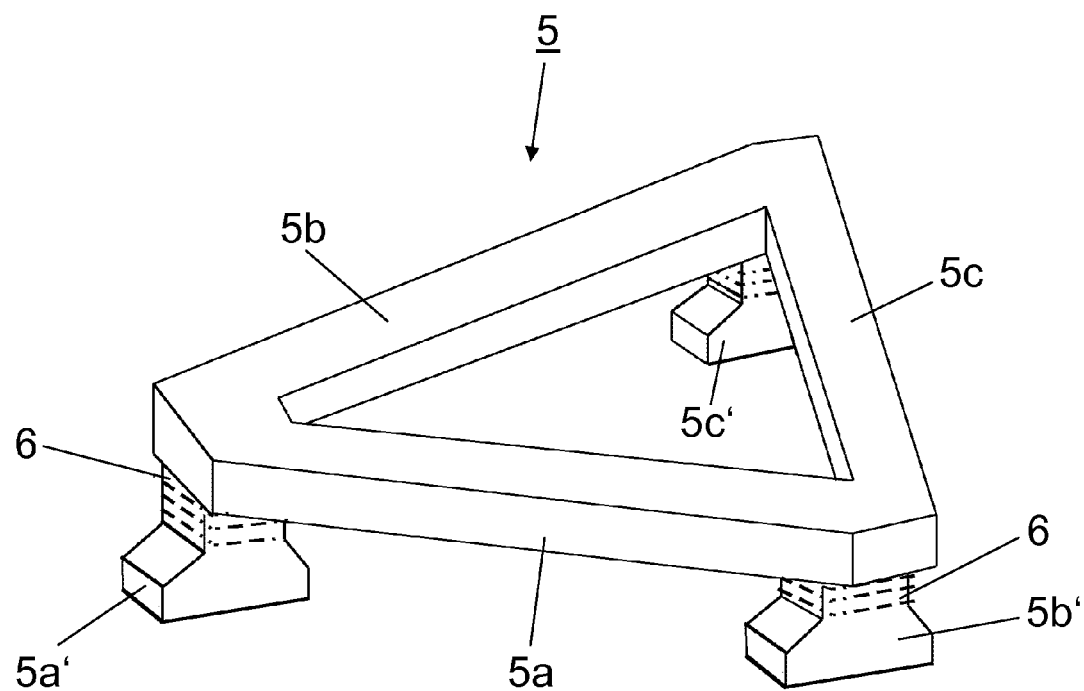
FIG. 2 shows a perspective view of a secondary system which is made up of a mobile iron core part which is in the form of an equilateral triangle and is provided only for transferring energy in the stationary state.

The symmetrical design of the energy transfer system is equally also ensured when, as illustrated in FIG. 2 using the example of a triangular mobile iron core part 9, the limbs 9a, 9b, 9c of the mobile iron core part 9 (and/or one of the stationary iron core parts) is in the form of an equilateral triangle with supporting posts 9a', 9b', 9c' which extend from the corner points of the abutting limbs in the direction of the ferromagnetic rails 2. In this example, the secondary windings are arranged on the supporting posts 9a', 9b', 9c' which are formed with running rollers 7. However, the primary and secondary windings can also be arranged on the limbs. In principle, iron core parts which are formed in a star-shaped manner or in a triangular manner can be combined with one another in the same energy transfer device.

The above-described device for inductive energy transfer is used, for example, for recharging the batteries of vehicles which are provided with an electric or hybrid drive. The primary system is incorporated in a parking area or a track, wherein a plurality of the above-described track segments can be lined up in a manner magnetically isolated from one another in order to be able to also perform energy transfer in the case of a relatively long distance and respective supply of current to the primary system. The secondary system can be fitted beneath the vehicle which is to be supplied with power such that it can be lowered and can be lowered onto the ferromagnetic rails of the primary system, which are incorporated in the track or parking area, as soon as the vehicle moves along the track segment or comes to a stop above a track segment. Only the respective track segment above which the vehicle is currently stopped or moving will be supplied with current.

The mobile iron core part 5 illustrated in FIG. 2, in contrast to the illustration in FIG. 1, does not have any running rollers on the supporting posts 5a', 5b', 5c' since, in the inoperative state, it is mounted directly on the supporting posts of a stationary iron core part which is arranged in a track or parking area (on its own and without magnetic rails).

Energy is fed to the respective track segment on the basis of a signal which is input into the secondary system and which is identified in the primary system only when a closed magnetic circuit is formed between the stationary and the mobile iron core part. The signals which are transmitted from the secondary system to the primary system ensure that only those windings of the primary system of which the stationary iron cores 3 form a closed magnetic circuit specifically with the mobile iron core part 5 are supplied with current. The targeted supply of current to the primary coils prevents, together with the closed magnetic iron circuit, the formation of stray fields with inductions which are impermissibly high for humans.

LIST OF REFERENCE SYMBOLS

1 Track segment
2 Magnetic rail
3 Stationary, star-shaped or triangular iron core part
3a, 3b, 3c Stationary limbs
3a', 3b', 3c' Stationary supporting posts
4 Primary winding
5 Mobile, star-shaped or triangular iron core part
5a, 5b, 5c Mobile limbs
5a', 5b', 5c' Mobile supporting posts
6 Secondary winding
7 Ferromagnetic running rollers
8 Recess
Z1, Z2, Z3 Center point of 3 or 5

The invention claimed is:

1. A device for inductive energy transfer, comprising a track which comprises a three-phase primary system made up of primary windings which are mounted on stationary ferromagnetic iron core parts, and an object which rolls or is stationary on the track comprises a three-phase secondary system which can be inductively coupled to the three-phase primary system and is made up of secondary windings which are mounted on a mobile ferromagnetic iron core part, characterized by a magnetically symmetrical design with magnetic flux paths of equal length through the primary windings and secondary windings of the three phases and correspondingly approximately constant power transfer during the movement in which the stationary ferromagnetic iron core parts are in the form of an equilateral triangle or in the form of a star which spans an equilateral triangle and has limbs of equal length which run at the same angle in relation to one another and supporting posts which extend from the ends of said limbs and also primary windings which are arranged at the same distance from one another, and the mobile ferromagnetic iron core part is in the form of an equilateral triangle or in the form of a star which spans an equilateral triangle and has limbs of equal length which run at the same angle in relation to one another and supporting posts which extend from the ends of said limbs and also secondary windings which are arranged at the same distance from one another wherein stationary ferromagnetic iron core parts arranged at a distance one behind the other and connected electrically in parallel or in series, are connected at the respective supporting posts by means of parallel magnetic rails onto which the mobile ferromagnetic iron core part is rollable or the mobile ferromagnetic iron core part is positionable with the aid of ferromagnetic running rollers which are accommodated in recesses in the mobile supporting posts.

2. The device as claimed in claim 1, wherein the two ferromagnetic stationary iron core parts, which are provided with primary windings and are connected electrically in parallel or in series, form a track segment, which can adjoin a voltage source, in connection with the magnetic rails.

3. The device as claimed in claim 2, wherein the two or more track segments are arranged one behind the other such that they are magnetically isolated from one another.

4. The device as claimed in claim 1, wherein the magnetic rails are incorporated in a track, and the stationary ferromagnetic iron core parts and primary windings are arranged underground.

5. The device as claimed in claim 1, wherein the magnetic rails or the running rollers are coated with a ferromagnetic, strong yet elastic, material.

6. A device for inductive energy transfer, comprising a track which comprises a three-phase primary system made up of primary windings which are mounted on a stationary ferromagnetic iron core part, and an object which can roll on the track yet is stationary comprises a three-phase secondary system which can be inductively coupled to the three-phase primary system and is made up of secondary windings which are mounted on a mobile ferromagnetic iron core part, characterized by a magnetically symmetrical design with magnetic flux paths of equal length through the primary windings and secondary windings of the three phases and correspondingly approximately constant power transfer, in which the stationary ferromagnetic iron core part is in the form of an equilateral triangle or in the form of a star which spans an equilateral triangle and the stationary ferromagnetic iron core part has limbs of equal length which run at the same angle in relation to one another and the stationary ferromagnetic iron core part has supporting posts which extend from the ends of said limbs and also primary or secondary windings which are arranged at the same distance from one another and the mobile ferromagnetic iron core part is in the form of an equilateral triangle or in the form of a star which spans an equilateral triangle and the mobile ferromagnetic iron core part has limbs of equal length which run at the same angle in relation to one another and the mobile ferromagnetic iron core part has supporting posts which extend from the ends of said limbs and also comprises secondary windings which are arranged at the same distance from one another.

7. The device as claimed in claim 1, wherein for stationary and mobile ferromagnetic iron core parts being star-shaped, the primary windings and the secondary windings are arranged on the supporting posts or on the limbs of said star-shaped stationary and mobile ferromagnetic iron core parts and the primary windings and the secondary windings are arranged at the same distance from center points of said stationary and mobile ferromagnetic iron core parts and for stationary and mobile ferromagnetic iron core parts being triangular-shaped the primary windings and the secondary windings are arranged on the supporting posts or centrally on the limbs of said stationary and mobile ferromagnetic iron core parts.

8. The device as claimed in claim 1, wherein the object which can roll is a vehicle which is entirely or partly electrically driven by means of rechargeable batteries, in which vehicle the horizontally and vertically adjustable ferromagnetic mobile iron core part is arranged such that it can be lowered onto the magnetic rails by way of the running rollers in order to recharge the rechargeable batteries in a moving state of the vehicle, wherein the primary windings of the track's three-phase primary system are supplied with current only when they are in contact with the mobile ferromagnetic iron core part.

9. The device as claimed in claim 8, wherein means for feeding a signal to the three-phase secondary system and means for identifying this signal in the three-phase primary system are provided, wherein the signal in the three-phase primary system can be identified only when there is a closed magnetic circuit between the three-phase primary system and the three-phase secondary system.

10. The device as claimed in claim 6, wherein for stationary and mobile ferromagnetic iron core parts being star-shaped, the primary windings and the secondary windings are arranged on the supporting posts or on the limbs of said star-shaped stationary and mobile ferromagnetic iron core parts and the primary windings and the secondary windings are arranged at the same distance from center points of said stationary and mobile ferromagnetic iron core parts and for stationary and mobile ferromagnetic iron core parts being triangular-shaped the primary windings and the secondary windings are arranged on the supporting posts or centrally on the limbs of said stationary and mobile ferromagnetic iron core parts.

11. The device as claimed in claim 6, wherein the object which can roll is a vehicle which is entirely or partly electrically driven by means of rechargeable batteries, in which vehicle the horizontally and vertically adjustable ferromagnetic mobile iron core part is arranged such that it can be lowered directly onto the stationary ferromagnetic iron core part in order to recharge the rechargeable batteries in a stationary state of the vehicle, wherein the primary windings of the track's three-phase primary system are supplied with current only when they are in contact with the mobile ferromagnetic iron core part.

12. The device as claimed in claim 11, wherein means for feeding a signal to the three-phase secondary system and means for identifying this signal in the three-phase primary system are provided, wherein the signal in the three-phase primary system can be identified only when there is a closed magnetic circuit between the three-phase primary system and the three-phase secondary system.

\* \* \* \* \*